(12) United States Patent
Abraham et al.

(10) Patent No.: US 9,699,036 B2
(45) Date of Patent: *Jul. 4, 2017

(54) PROFILE BASED DISCOVERY ENGINE CONFIGURATIONS FOR NEIGHBORHOOD AWARE WI-FI NETWORKS

(71) Applicant: QUALCOMM Incorporated, San Diego, CA (US)

(72) Inventors: Santosh Paul Abraham, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 14/664,641

(22) Filed: Mar. 20, 2015

(65) Prior Publication Data

US 2015/0195768 A1 Jul. 9, 2015

Related U.S. Application Data

(63) Continuation of application No. 13/753,227, filed on Jan. 29, 2013, now Pat. No. 9,049,578.

(Continued)

(51) Int. Cl.
*H04L 12/24* (2006.01)
*H04L 29/08* (2006.01)
(Continued)

(52) U.S. Cl.
CPC ......... *H04L 41/12* (2013.01); *H04L 41/0869* (2013.01); *H04L 67/16* (2013.01);
(Continued)

(58) Field of Classification Search
CPC ......... H04L 29/06306; H04L 29/06836; H04L 29/08711; H04L 29/08918; H04L 29/08927; H04L 29/08936
See application file for complete search history.

(56) References Cited

U.S. PATENT DOCUMENTS 8,285,860 B2   10/2012  McGuire et al.
9,049,578 B2*  6/2015   Abraham .............. H04W 4/206
(Continued)

FOREIGN PATENT DOCUMENTS

EP    1617604 A1    1/2006
WO    2004008793 A1  1/2004

OTHER PUBLICATIONS

Carver C., et al., "A Privacy-preserving Proximity Friend Notification Scheme with Opportunistic Networking," Wireless Networks Symposium, IEEE ICC, 2012, pp. 5387-5392.
(Continued)

*Primary Examiner* — Benjamin H Elliott, IV
(74) *Attorney, Agent, or Firm* — Eric Ho

(57) ABSTRACT

Methods, devices, and computer program products for transmitting and receiving discovery and paging messages in a wireless communication device are described herein. In one aspect, a wireless apparatus operable in a wireless communication system includes a discovery engine configured to communicate with a wireless network based on a profile, the profile having defined use parameters, the discovery engine being configured to receive an input from an application indicating a selection of a profile, the discovery engine further configured to receive one or more attributes from the application and configure the profile using the one or more attributes, the attributes containing information to configure the profile to perform certain functions as defined by the application.

40 Claims, 8 Drawing Sheets

Related U.S. Application Data

(60) Provisional application No. 61/718,142, filed on Oct. 24, 2012.

(51) Int. Cl.
*H04W 4/20* (2009.01)
*H04W 8/18* (2009.01)
*H04W 48/16* (2009.01)
*H04W 76/02* (2009.01)
*H04W 40/24* (2009.01)

(52) U.S. Cl.
CPC ............ *H04L 67/30* (2013.01); *H04W 4/206* (2013.01); *H04W 8/18* (2013.01); *H04W 40/246* (2013.01); *H04W 48/16* (2013.01); *H04W 76/02* (2013.01); *H04L 69/321* (2013.01)

(56) References Cited

U.S. PATENT DOCUMENTS

| | | |
|---|---|---|
| 2004/0131078 A1 | 7/2004 | Gupta et al. |
| 2010/0165961 A1 | 7/2010 | Rosario et al. |
| 2010/0233960 A1 | 9/2010 | Tucker et al. |
| 2011/0060816 A1 | 3/2011 | Kumar et al. |
| 2012/0134349 A1 | 5/2012 | Jung et al. |
| 2012/0150960 A1 | 6/2012 | Nalawade |
| 2012/0192258 A1 | 7/2012 | Spencer et al. |
| 2012/0244902 A1 | 9/2012 | Saito et al. |
| 2013/0346207 A1 | 12/2013 | Qi et al. |
| 2014/0112189 A1 | 4/2014 | Abraham et al. |
| 2015/0195142 A1* | 7/2015 | Abraham .............. H04W 4/206 370/254 |
| 2015/0195768 A1* | 7/2015 | Abraham .............. H04W 4/206 370/254 |

OTHER PUBLICATIONS

International Search Report and Written Opinion—PCT/US2013/066433—ISA/EPO—Feb. 6, 2014.

Wong A.K.Y., "The Near-Me Area Network," Spotlight, Published by the IEEE Computer Society, IEEE Internet Computing, 2010, pp. 74-77.

* cited by examiner

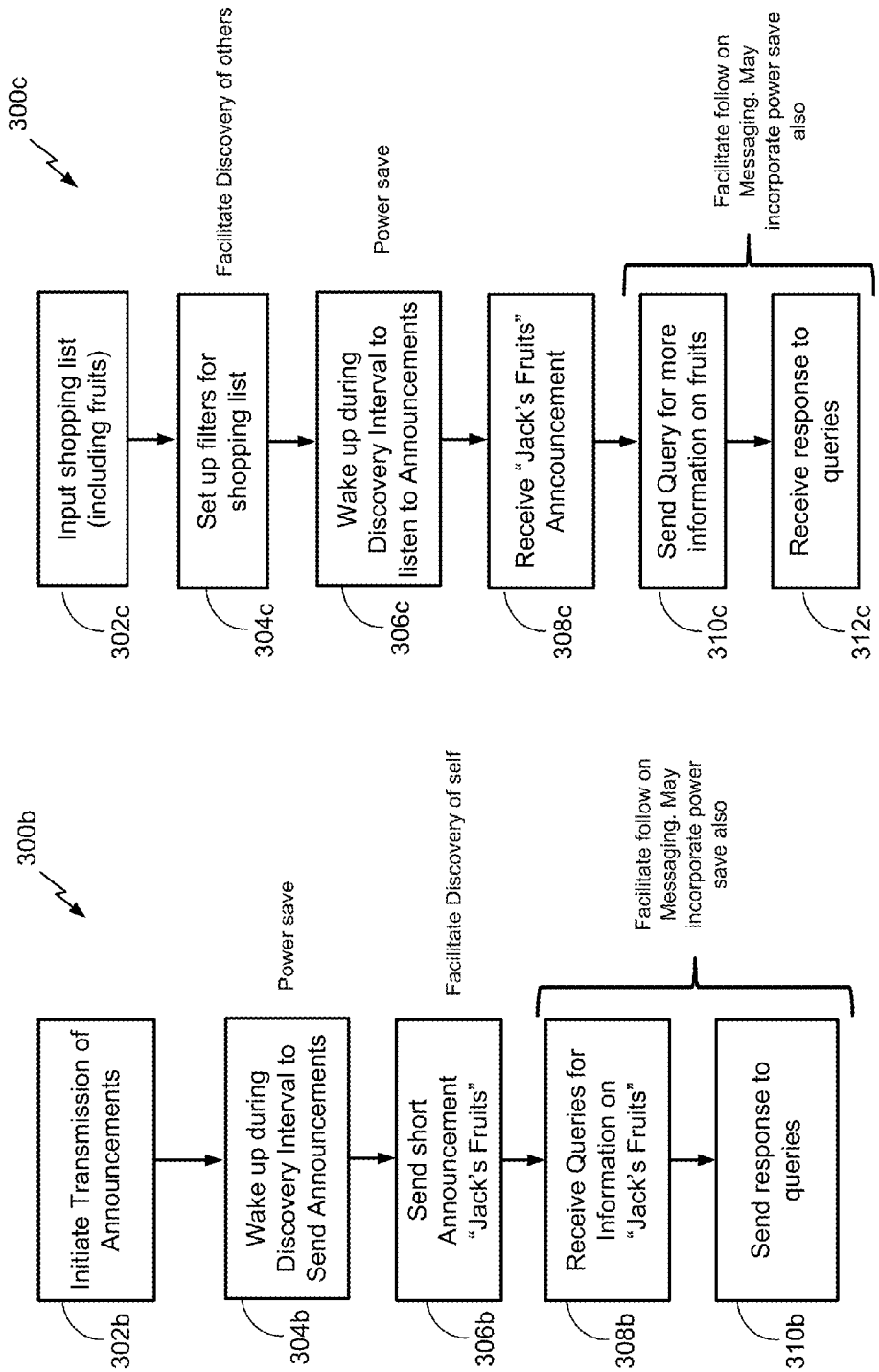

PROFILE BASED DISCOVERY ENGINE CONFIGURATIONS FOR NEIGHBORHOOD AWARE WI-FI NETWORKS

CROSS REFERENCE TO RELATED APPLICATIONS

The present application for patent is a continuation of U.S. patent application Ser. No. 13/753,227 entitled "PROFILE BASED DISCOVERY ENGINE CONFIGURATIONS FOR NEIGHBORHOOD AWARE WI-FI NETWORKS," filed on Jan. 29, 2013, the disclosure of which is hereby incorporated by reference in its entirety, which claims priority under 35 U.S.C. §119(e) to U.S. Provisional Application No. 61/718,142 entitled "PROFILE BASED DISCOVERY ENGINE CONFIGURATIONS FOR NEIGHBORHOOD AWARE WI-FI NETWORKS" filed Oct. 24, 2012, the disclosure of which is hereby incorporated by reference in its entirety.

BACKGROUND

Field

The present application relates generally to wireless communications, and more specifically to systems, methods, and devices for securely transmitting and receiving discovery and paging messages.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network may transmit and/or receive information to and from each other. The information may comprise packets, which in some aspects may be referred to as data units. The packets may include overhead information (e.g., header information, packet properties, etc.) that helps in routing the packets through the network, identifying the data in the packets, processing the packets, etc. The packets may further include data, such as user data, multimedia content, etc. that may be carried in a payload of the packet. Packets may additionally be used to introduce two different devices communicating on a medium. The communication medium may be shared by multiple devices and may be monitored by potentially harmful devices seeking to misuse (e.g., intercept, replay, etc.) the communicated packets. Thus, improved systems, methods, and devices for securing the communication of packets or messages transmitted and/or received via the medium are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the disclosure is a wireless apparatus operable in a wireless communication system including a discovery engine configured to communicate with a wireless network based on a profile, the profile having defined use parameters, the discovery engine being configured to receive an input from an application indicating a selection of a profile, the discovery engine further configured to receive one or more attributes from the application and configure the profile using the one or more attributes, the attributes containing information to configure the profile to perform certain functions as defined by the application. The apparatus may also include a memory unit configured to store one or more profiles, and a first processor in communication with the discovery engine, the first processor configured to run the application, communicate a selection of a profile to the discovery engine, and provide attributes for the selected profile to the discovery engine. The apparatus may include a second processor, the second processor comprising the discovery engine.

Another innovation is a method of wireless communication for communicating between a wireless device and near-area devices communicating on a network, the method including providing a selection of one or more communication profiles to an application, receiving a selection of one of the provided profiles from the application, receiving one or more attributes containing information to configure the profile to perform functions, populating the profile with the attributes, and establishing communication between the wireless device and at least one near-area network based at least on the populated profile.

In some implementations, a plurality of communication profiles are stored in a memory of the wireless device, wherein each of at least a subset of the stored profiles has a unique set of parameters, the parameters selected to provide a profile for use in a predetermined context. In some implementations, the one or more attributes containing information received are limited to those related to the set of parameters present in the selected profile. In some implementations, the one or more attributes related to the set of parameters present in the selected profile are predefined by the profile. In some implementations, the one or more of the attributes received modifies an attribute predetermined by the profile. In some implementations, at least one of the stored profiles is configured to perform one or more functions selected from the group consisting of query for services, finding an existing NAN, initiating a NAN, joining a NAN, and merging an existing NAN with another NAN. In some implementations, a profile configured to perform the function of initiating a NAN has one or more parameters selected from the group consisting of identifiers, device location, timing source, notification mode, interval for timing, and query response. The one or more attributes received from the application may define at least one of the one or more of the parameters. In some implementations, a profile configured to perform the function of joining a NAN has one or more parameters selected from the group consisting of service identifiers to search for, device identifier, time out for search operation, timing and channel information, preference criteria for choosing a NAN when more than one NAN is present. In some implementations, the one or more attributes received from the application define at least one of the one or more of the parameters. In some implementations, a profile configured to perform the function of query for service has one or more parameters selected from the group consisting of service identifier to search for, number of results to accumulate before returning results, time out for search query, timing parameters of NAN to query. In some implementations, the one or more attributes received from the application define at least one of the one or more of the parameters. In some implementations, a discovery engine establishes the communication, and wherein the method further comprises the discovery engine communicating with a first processor running the application information regarding communication with the near-area network. In some implementations, the communications profiles are stored in a memory, wherein the application runs on a first processor in communication with a discovery engine, and wherein the discovery engine receives the selection of a profile from the application, receives the one or more attributes, populates the profile with the attributes, and establishes communication between the wireless device and the near-area network. A second processor comprises the discovery engine. In some implementations, discovery engine filters received packets based on the attributes and the profile. In some implementations, the discovery engine identifies a NAN to join based on the attributes and the profile. In some implementations, the discovery engine synchronizes with the timing of the identified NAN to join. In some implementations, the wireless device further comprises a transmitter, and the discovery engine communicates discovery frames to the transmitter and the transmitter transmits the discovery frames to the identified NAN. In some implementations, the discovery engine communicates with the first processor when the a NAN has successfully been joined based on the attributes and the profile provided and selected by the application. In some implementations, the discovery engine searches for a NAN to join based on the attributes and the profile, and wherein the discovery engine establishes a NAN based on the attributes and profile if a NAN cannot be found. In some implementations, the discovery engine communicates with the first processor when the apparatus has successfully established a NAN based on the attributes and the profile.

Another innovation is a non-transitory computer-readable medium comprising code that, when executed, causes a wireless device to provide a selection of one or more communication profiles to an application running on the device, receive a selection of one of the provided profiles from the application, receive one or more attributes containing information to configure the profile to perform functions, populate the profile with the attributes, and establish communication between the wireless device and at least one near-area network based at least on the populated profile. In some implementations, a plurality of communication profiles are stored in a memory of the wireless device, wherein each of at least a subset of the stored profiles has a unique set of parameters, the parameters selected to provide a profile for use in a predetermined context.

Another innovation is a wireless apparatus operable in a wireless communication system, the apparatus including a first means for computing configured to communicate with a wireless network based on a profile, the profile having defined use parameters, the first computing means being configured to receive an input from an application indicating a selection of a profile, the first computing means further configured to receive one or more attributes from the application and configure the profile using the one or more attributes, the attributes containing information to configure the profile to perform certain functions as defined by the application. The apparatus may further comprise means for storing data configured to store one or more profiles, and a second means for computing in communication with the first computing means, the second computing means configured to run the application, communicate a selection of a profile to the first computing means, and provide attributes for the selected profile to the first computing means.

BRIEF DESCRIPTION OF THE DRAWINGS

FIG. 3b is a flowchart of an exemplary process of discovering devices in a wireless communication system in accordance with aspects of the present disclosure.

FIG. 3c is a flowchart of an exemplary process of querying devices in a wireless communication system in accordance with aspects of the present disclosure.

DETAILED DESCRIPTION

Figure 1:
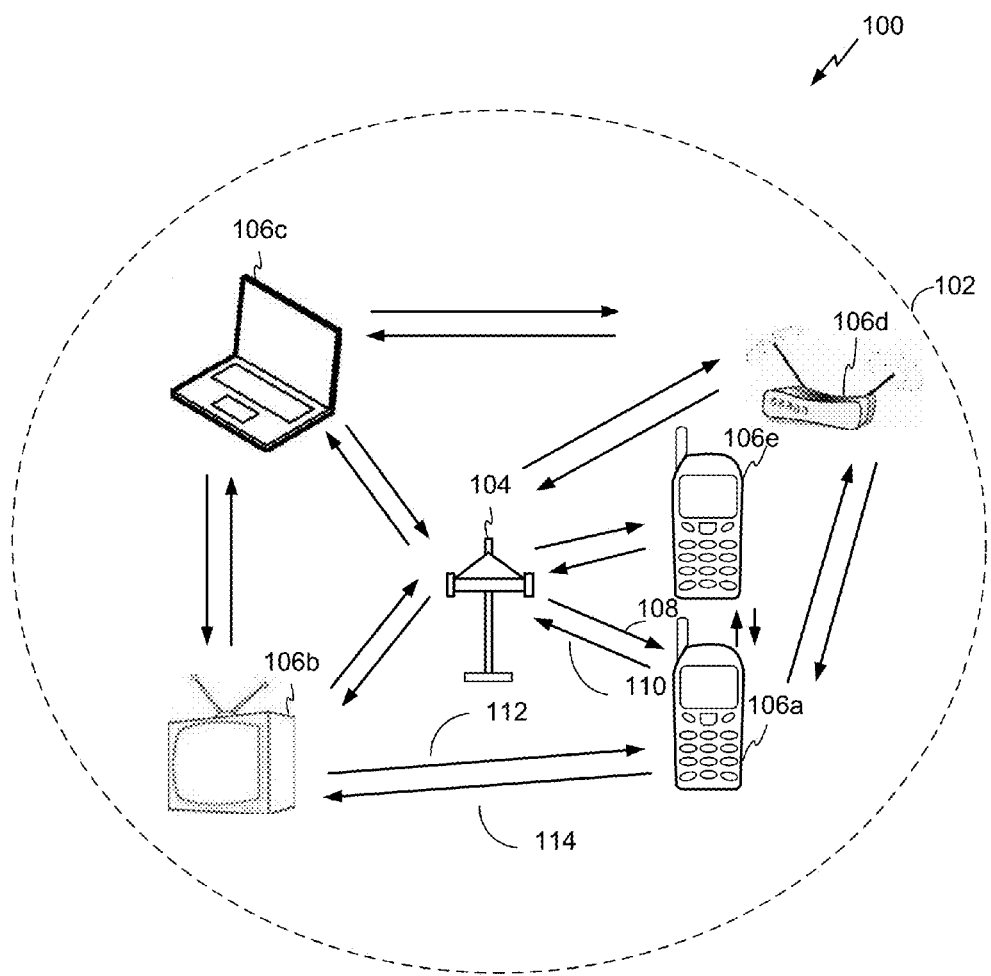
FIG. 1 illustrates an example of a wireless communication system in which aspects of the present disclosure may be employed.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Devices, such as a group of stations, for example, may be used for neighborhood aware networking, or social-WiFi networking. For example, various stations within the network may communicate on a device to device (e.g., peer-to-peer communications) basis with one another regarding applications that each of the stations support. Wireless network technologies for social-WiFi networking may include various types of WLANs and near-area, (or near-me area) networks (NANs). A NAN may be used to connect nearby devices together, employing certain networking protocols. The wireless devices in a NAN can belong to different proprietary network infrastructures (for example, different mobile carriers). So, even though two devices are geographically close, the communication path between them might, in fact, traverse a long distance, going from a LAN, through the Internet, and to another LAN. NAN applications focus on two-way communications among people within a certain proximity to each other, but don't generally concern themselves with those people's exact locations. Some services are meaningful only to a group of people in close proximity, which has generated the need for NANs. Some non-limiting examples of NAN uses are illustrated in the following scenarios:

Allie is going to the supermarket to buy three bottles of red wine. The supermarket offers a 30 percent discount on the purchase of six bottles, so she sends a message to other customers to see if they would like to buy the other three bottles of wine.

Elissa bought a movie ticket 15 minutes ago, but she now feels dizzy and can't watch the film. She sends out messages to people around the cinema to see if anyone will purchase her ticket at 50 percent off.

In a theme park, guests would like to know each ride's queue status to reduce their waiting time. So, they take a photo of the queue they're in and share it with other guests through a NAN application.

Marcy works in Del Mar and would like to find someone to have lunch with. She checks her friend list to see who is closest to her at this moment and invites that friend to join her.

Paige just lost her son in the street, so she sends out his picture, which is stored in her mobile device, to near passers-by to see if they can find him Katie, half-a-block away from Paige, finds Paige's son using the picture she received on her smart phone, and contacts Paige to tell her where to find him.

Accordingly, it is desirable for a discovery protocol used in a social-WiFi network to enable STAs to advertise themselves (e.g., by sending discovery packets or messages) as well as discover services provided by other STAs (e.g., by sending paging or query packets or messages), while ensuring secure communication and low power consumption.

FIG. 1 illustrates an example of a wireless communication system 100 in which aspects of the present disclosure may be employed. The wireless communication system 100 may operate pursuant to a wireless standard, such as an 802.11 standard. The wireless communication system 100 may include an AP 104, which communicates with STAs 106. In some aspects, the wireless communication system 100 may include more than one AP. Additionally, the STAs 106 may communicate with other STAs 106. As an example, a first STA 106a may communicate with a second STA 106b. As another example, a first STA 106a may communicate with a third STA 106c although this communication link is not illustrated in FIG. 1.

A variety of processes and methods may be used for transmissions in the wireless communication system 100 between the AP 104 and the STAs 106 and between an individual STA, such as the first STA 106a, and another individual STA, such as the second STA 106b. For example, signals may be sent and received in accordance with OFDM/OFDMA techniques. If this is the case, the wireless communication system 100 may be referred to as an OFDM/OFDMA system. Alternatively, signals may be sent and received between the AP 104 and the STAs 106 and between an individual STA, such as the first STA 106a, and another individual STA, such as the second STA 106b or STA 106e. In some implementations the communications between STAs is in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

A communication link may be established between STAs, such as during social-WiFi networking. Some possible communication links between STAs are illustrated in FIG. 1. As an example, a communication link 112 may facilitate transmission from the first STA 106a to the second STA 106b. Another communication link 114 may facilitate transmission from the second STA 106b to the first STA 106a.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
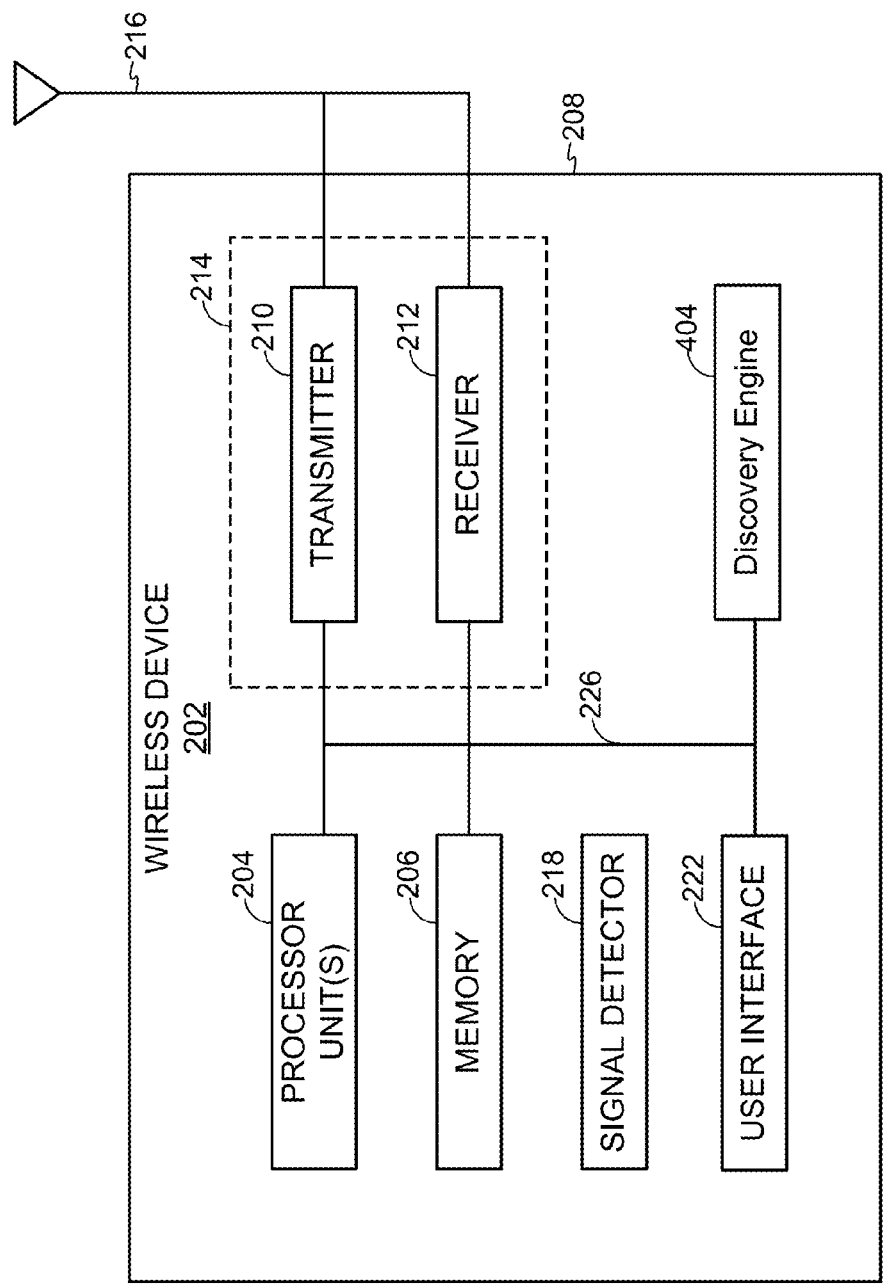
FIG. 2 illustrates a functional block diagram of a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein. The processor 204 may be configured to run applications, for example, social gaming applications or other applications that are facilitated by communications using a near-area network (NAN).

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different packet types or functions. For example, the transmitter 210 may be configured to transmit packets of different types generated by the processor 204. When the wireless device 202 is implemented or used as an AP 104 or STA 106, the processor 204 may be configured to process packets of a plurality of different packet types. For example, the processor 204 may be configured to determine the type of packet and to process the packet and/or fields of the packet accordingly. When the wireless device 202 is implemented or used as an AP 104, the processor 204 may also be configured to select and generate one of a plurality of packet types. For example, the processor 204 may be configured to generate a discovery packet comprising a discovery message and to determine what type of packet information to use in a particular instance.

The receiver 212 may be configured to wirelessly receive packets having different packet types. In some aspects, the receiver 212 may be configured to detect a type of a packet used and to process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The wireless device 202 may further comprise a discovery engine 404. One or more of the other components of device 202 may be coupled to and in communication with the discovery engine 404. As described in more detail below, the discovery engine can be configured with one or more profiles, each profile defining certain communication functionality. In operation, the discovery engine 404 may provide a profile, or a selection of profiles (or a set of profiles) to an application running on the processor 204. The application selects a profile and indicates its selection to the discovery engine 404. The application also provides the discovery engine attributes specific to the application to add certain parameters to the profile defining communication functionality. The discovery engine 404 is configured to use the selected profile (now configured with information form the application) to perform communication for the application, for example, communication with near-by devices or devices defined (and joined to) a near-area network (NAN).

The various components of the wireless device 202 may be coupled together by a bus system 226. The bus system 226 may include a data bus, for example, as well as a power bus, a control signal bus, and a status signal bus in addition to the data bus. The components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

To ensure proper communication between devices such as AP 104 and the STAs 106 or between multiple STAs 106, the AP 104 or STAs 106 may require information regarding characteristics of the AP 104 or STAs 106. For example, the STA 106 may require timing information about the AP 104 in order to synchronize timing of communication between the STA 106 and the AP 104. Additionally or alternatively, the STA 106 may require other information such as a medium access control (MAC) address of the AP 104 or another STA, an identifier of the basic service set (BSS) served by the AP 104, etc. The STA 106 may determine whether it needs such information independently, such as through software that is executed using memory 206 and processor 204.

The AP 104 or STA 106 may have a plurality of operational modes. For example, the STA 106 may have a first operational mode referred to as an active mode, normal operation mode, or full power mode. In the active mode, the STA 106 may always be in an "awake" state and actively transmit/receive data with another STA 106. Further, the STA 106 may have a second operational mode referred to as a power-save mode or sleep mode. In the power-save mode, the STA 106 may be in the "awake" state or may be in a "doze" or "sleep" state where the STA 106 does not actively transmit/receive data with another STA 106. For example, the receiver 212 and possibly DSP 220 and signal detector 218 of the STA 106 may operate using reduced power consumption in the doze state. Further, in the power-save mode, an STA 106 may occasionally enter the awake state to listen to messages from an AP 104 or from other STAs (e.g., paging messages) that indicate to the STA 106 whether or not the STA 106 needs to "wake up" (e.g., enter the awake state) at a certain time so as to be able to transmit/receive data with the AP 104 or another STA.

Figure 3A:
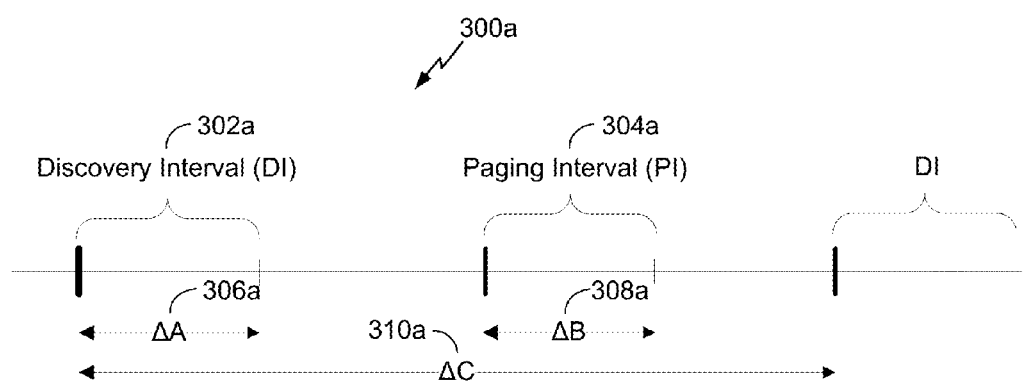
FIG. 3a illustrates an exemplary communication timeline in a wireless communication system in accordance with aspects of the present disclosure.

FIG. 3a illustrates an exemplary communication timeline 300a in a wireless communication system where devices may communicate via one channel. The exemplary communication timeline 300a may include a discovery interval (DI) 302a of a time duration ΔA 306a, a paging interval (PI) 304a of a time duration ΔB 308a, and an overall interval of a time duration ΔC 310a. In some aspects, communications may occur via other channels as well. Time increases horizontally across the page over the time axis.

During the DI 302a, APs or STAs may advertise services through broadcast messages such as discovery packets. APs or STAs may listen to broadcast messages transmitted by other APs or STAs. In some aspects, the duration of DIs may vary over time. In other aspects, the duration of the DI may remain fixed over a period of time. The end of the DI 302a may be separated from the beginning of the subsequent PI 304a by a first remainder period of time as illustrated in FIG. 3a. The end of the PI 304a may be separated from the beginning of a subsequent DI by a different remainder period of time as illustrated in FIG. 3a.

During the PI 304a, APs or STAs may indicate interest in one or more of a plurality of services advertised in a broadcast message by transmitting paging request messages such as paging request packets. APs or STAs may listen to paging request messages transmitted by other APs or STAs. In some aspects, the duration of the PI may vary over time. In other aspects, the duration of the PI may remain constant over a period of time. In some aspects, the duration of the PI may be less than the duration of the DI.

The overall interval of duration ΔC 310a may measure the period of time from the beginning of one DI to the beginning of a subsequent DI as illustrated in FIG. 3a. In some aspects, the duration of the overall interval may vary over time. In other aspects, the duration of the overall interval may remain constant over a period of time. At the conclusion of the overall interval of duration ΔC 310a, another overall interval may begin, including a DI, a PI, and the remainder intervals. Consecutive overall intervals may follow indefinitely or continue for a fixed period of time.

An STA may enter a sleep or power-save mode when the STA is not transmitting or listening or is not expecting to transmit or listen. As an example, the STA may sleep during periods other than the DI or PI. The STA in the sleep mode or power-save mode may awake or return to normal operation or full power mode at the beginning of the DI or PI to enable transmission or listening by the STA. In some aspects, the STA may awake or return to normal operation or full power mode at other times when the STA expects to communicate with another device, or as a result of receiving a notification packet instructing the STA to awake. The STA may awake early to ensure that the STA receives a transmission.

As described above, during the DI, APs or STAs may transmit discovery packets (DPs). During the PI, APs or STAs may transmit paging request packets (PRs). A DP may be a packet configured to advertise a plurality of services provided by a STA or AP and to indicate when the paging interval is for the device that transmits the discovery packet. The DP may include a data frame, management frame, or management action frame. The DP may carry information generated by a higher layer discovery protocol or an application based discovery protocol. The PR may be a packet configured to indicate interest in at least one of the plurality of services provided by an AP or STA.

The start and end of the DI and PI may be known via numerous methods to each STA desiring to transmit a discovery packet or a paging request packet. In some aspects, each STA may synchronize its clock with the other APs or STAs and set a shared DI and PI start time and DI duration and PI duration. In other aspects, a device may send a signal such as a special clear to send (S-CTS) signal to clear the medium of legacy communications, such as communications that may conflict or not be compliant with aspects of the present disclosure, and indicate the beginning and duration of the DI or PI period, as well as additional information about the DI and PI durations.

An STA potentially interested in services advertised via discovery packets, such as from other STAs, may awake or remain awake during the DI and process discovery packets to determine if a particular discovery packet includes information about one or more of a plurality of services that may be of interest to the receiving STA. After the DI period, STAs not planning to communicate information may enter a sleep or power-save mode for a break period until the next time the STAs plan to communicate. In some aspects, an STA may enter the sleep or power-save mode until the STA may communicate additional information with another device outside of the DI or PI. In some aspects, the STA may enter the sleep or power-save mode until the beginning of the next PI. At the beginning of the PI, the interested STA may awake to transmit a paging request packet to the provider of the service.

An STA waiting for a response to a transmitted discovery packet, such as discovery packets transmitted to other STAs, may awake or remain awake during the PI and process paging request packets to determine if a particular paging request packet indicates interest by another device in at least one of plurality of services provided by the STA. After the PI period, STAs not planning to communicate information may enter a sleep or power-save mode for a break period until the next time the STAs plan to communicate. In some aspects, an STA may enter the sleep or power-save mode until the STA may communicate additional information with another device outside of the DI or PI. In some aspects, the STA may enter the sleep or power-save mode until the beginning of the next DI.

As examples, the duration $\Delta C$ of the overall interval may equal approximately one to five seconds in some aspects. In other aspects, the overall interval may be less than one second or more than five seconds. The duration $\Delta A$ of the DI may equal approximately 16 ms in some aspects while more or less than 16 ms in other aspects. The duration $\Delta B$ of the PI may equal approximately the duration $\Delta A$ in some aspects. In other aspects, the duration $\Delta B$ may be more or less than the duration $\Delta A$.

FIG. 3b is a flowchart of an exemplary process 300b of discovering devices in a wireless communication system in accordance with aspects of the present disclosure. The process 300b may be used to introduce two devices, such as two STAs. For example, an STA may advertise information about one or more of a plurality of services that may be of interest to various other STAs to which the information is directed. In some embodiments, a service offered by an STA may include a service offered by an application (e.g., a gaming application, a shopping application, a social networking application, etc.) that a user has downloaded or that is native to the STA. For example, a user of the STA may want to invite other users of the application to interact with the user via the application. At block 302b, the STA may initiate transmission of announcements. Each announcement may include a discovery packet or message including the information relating to the one or more services. At block 304b, the STA may wake up from a power-save mode or sleep mode during a discovery interval to send announcements to one or more STAs. At block 306b, the STA may send one or more short announcements regarding a particular service, such as "Jack's Fruits," in order to facilitate discovery of the STA. The short announcements may include a discovery packet or message. The receiving STAs that are interested in the one or more services advertised by the STA may respond with a paging request (or query request) packet or message that indicates interest in the service provided by the STA. At block 308b, the STA may receive queries (e.g., a paging or query request) for information on the particular service, such as "Jack's Fruits." In response, at block 310b, the STA may send a response to the queries. Follow on messaging between the STA and the various querying STAs may occur. The STA and the various STAs may enter power-save mode or sleep mode in the intervals between the exchanges of messages between the STAs. The receiving may be performed by receiver 212 or the transceiver 214, for example, and the transmitting may be performed by the transmitter 210 or the transceiver 214, for example.

FIG. 3c is a flowchart of an exemplary process 300c of querying devices in a wireless communication system in accordance with aspects of the present disclosure. At block 302c, an STA may input a shopping list, which may include various vendors that a user of the STA may have an interest. For example, a user may download a shopping list from the Internet. Although the process 300c is described with respect to a shopping application, those having ordinary skill in the art will appreciate that the process 300c applies to other applications, such as gaming applications, social networking applications, etc. At block 304c, the STA may set up filters for the shopping list. For example, a filter may be set up to allow the STA to wake up from a power-save mode or sleep mode only when a discovery packet or message is received for particular vendors or applications. At block 306c, the STA may wake up during a discovery interval to listen to announcements. Each announcement may include a discovery packet or message including information relating to one or more services offered by one or more other STAs. At block 308c, the STA may receive an announcement from a second STA, such as a "Jack's Fruits" announcement. The STA may determine whether it is interested in one or more sets of information related to the announcement and may respond with a paging request (or query request) packet or message that indicates its interest in the information. For example, if the STA is interested in a particular sale item offered by the second STA, the STA may respond with a paging request (or query request) packet or message. At block 310c, the STA sends a query for more information relating to the announcement, such as more information on Jack's Fruits. At block 312c, the STA may receive a response to one or more queries that the STA sent to other STAs regarding services offered by the other STAs.

It is desirable for the STAs described above (e.g., using a discovery protocol used in a social-WiFi network) to be able to advertise themselves, as well as discover services provided by other STAs, using a secure communication protocol and while keeping power consumption low. For example, it is desirable for an STA to advertise its offered services by securely sending discovery packets or messages and for the STA to discover services offered by other STAs by securely sending paging or query packets or messages.

In relation to the disclosure of a discovery engine and related NAN technology, as used herein, "initialization" is a broad term that may refer to Procedures used by a service to start publishing or subscribing of services in a NAN. Initialization steps or processes may involve joining an existing NAN or starting a NAN. As used herein, "merging" is a broad term that may refer to Procedures to be used by a set of devices that are already in a first NAN (for example, NAN-1) to become part of second NAN (for example, NAN-2) and terminate operation of the first NAN (NAN-1).

Figure 4:
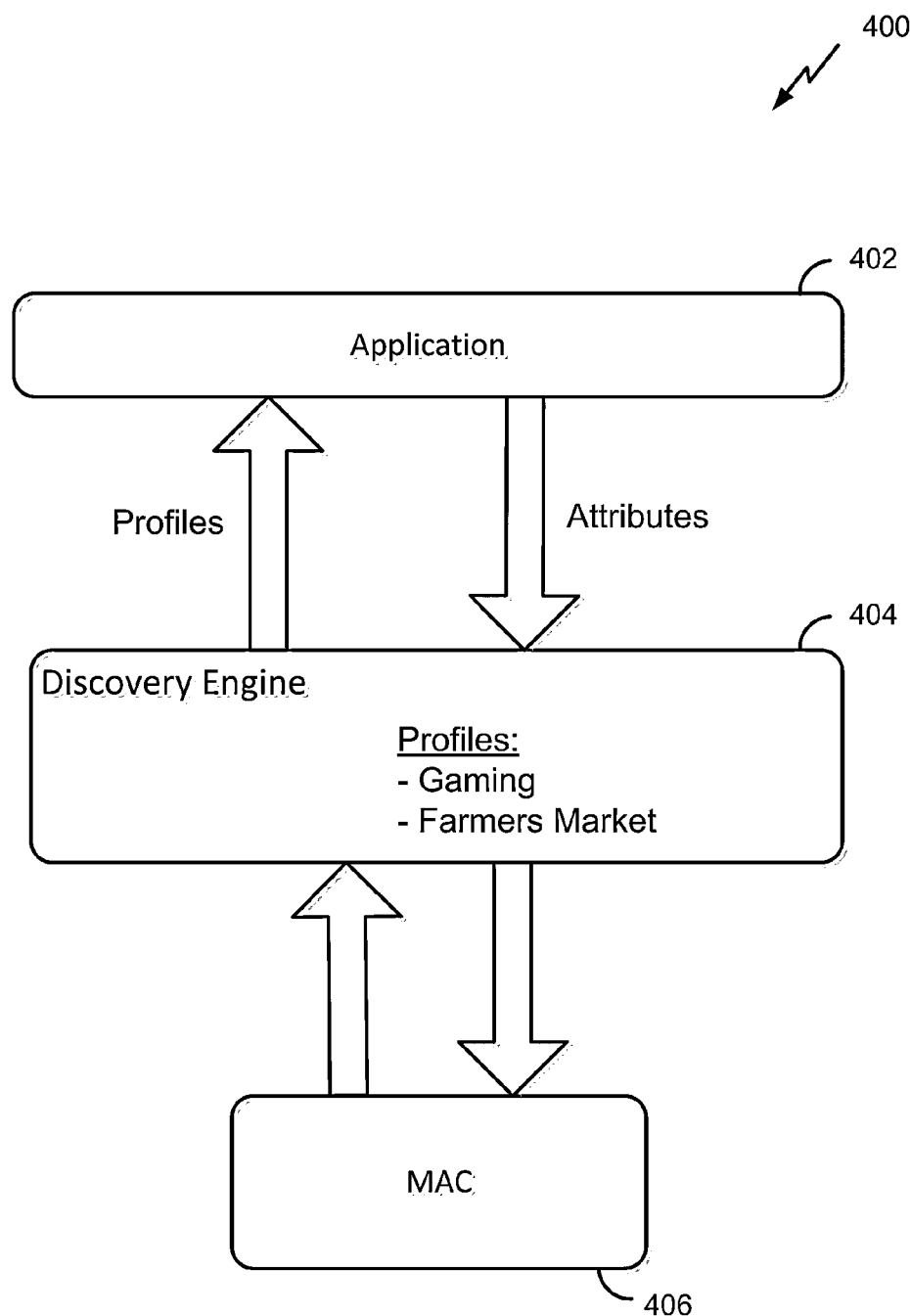
FIG. 4 illustrates a functional block diagram of a discovery engine that may be included in a wireless device, for example, the device illustrated in FIG. 2.

Certain aspects of this disclosure provide a framework for operation of a discovery engine (for example, but not limited to, in a wireless device) that enables different types of applications to effectively use near-area network (NAN) features. FIG. 4 illustrates a functional block diagram of a discovery engine 404 that may be included in a wireless device, for example, the device 400 illustrated in FIG. 2. The wireless device 400 may also include an application 402 that communicates with the discovery engine 404, and a medium access control 406 layer that also communicates with the discovery engine 404. In some implementations, the application 402 chooses a profile provided by the discovery engine 404. Functionalities defined by profiles may include one or more of query for services, initiation or joining NAN, passive NAN discovery, and cluster merge. In some implementations, a device may restrict the functionality of profiles based on device capabilities and other factors. The discovery engine 404 is configured to communicate with the application 402 and receive a selection of a profile from the application 402. The discovery engine 404 is further configured to receive configuration information (for example, attributes) for the selected profile from the application 402. Once the application 402 provides attributes and any other information needed to the discovery engine 404, the application 402 may go to sleep until the discovery engine requires further interaction with it.

Such a discovery engine 404 may perform different actions (or "behave" differently) based on one or more of the requirements of application 402. Factors that may influence the actions (or behavior) of the discovery engine 404 may include efficient power consumption (for scanning & initialization), availability of a third party timing (for example cellular), application requirements such as, how quick the discovery can be, whether or not to start a NAN cluster if none is found after a certain period, particular attributes that determine different discovery engine behavior for different activities, and whether to wait and join an existing NAN, or start one and have others join. In some implementations, a discovery engine 404 will include a one or more profiles, each profile for a different use. In some implementations, the discovery engine 404 includes a set of profiles. The discovery engine 404 provides the one or more profiles to the application 402 to select a profile and parameterize the profile by communicating attributes to the discovery engine 404. In some implementations, the discovery engine 404 and the profiles may reside within the medium access control layer.

One example of a profile of a discovery engine 404 is social gaming. A social gaming application 402 can provide the discovery engine 404 parameters that facilitate certain features for social gaming. For a social gaming profile, users typically want to quickly start or join an existing group of players on a near-area network. For such profiles, the discovery engines on the wireless devices for the current group of players may be configured to quickly allow a new user to discover the group. The discovery engine of a new user should be configured with identifiers and frequency of advertisement for the game. One consideration for the existing group discovery only a few members of the group need to advertise at any given time. New user needs to find out about the existence of the game and not necessarily every device that is participating in the game. To conserve power, the discovery engine 404 may also be configured to quit searching for the social game or a NAN communicating the social game within a certain time. In some implementations, the search time may be user selectable or user defined. Some key characteristics of this use case (that is, specific to a use case of social gaming) may include a user activated search, a relatively quick response expected, limited duration of scanning, and operating when there is no GPS available.

Another example of a "use" profile for a discovery engine is a farmer's market or other similar outdoor shopping or market scenario. In this scenario, often the activity all takes place outdoors and participating wireless devices may rely on cellular or GPS for synchronization. A farmer's market application may provide the discovery engine 404 attributes to parameterize (or populate) the farmer's market profile. Such attributes may include, for example, time offsets and time intervals to turn on the radio, configuration for certain data filters, key characteristics of this use case (specific to this use farmer's market/shopping case), background search (for example, the wireless device beeps if a match is found), long scanning duration, longer response time permitted, and whether GPS available/Cellular timing available and if there is a preference to use.

To facilitate the various uses of a NAN, discovery engine profiles may be defined in WFA NAN for functionality that can be used by the application 402. For example, such functionality can be scanning related (finding an existing NAN). Such functionality can address, for example, active limited scanning with no external timing source or background scanning with external timing source. Active limited scanning functionality (for example, for a social gaming profile) can include service identifiers and related parameters (for example, name of the game, etc.), which may be encrypted. Active limited scanning functionality can also address a "time out" when to stop searching, and search periodicity (with a special value for continuous search). Background scanning functionality (for example, for a farmer's market profile) can include UTC time "offsets" and periodicity to expect discovery messages, when to, and how to handle, time outs (to stop searching), service identifiers and related parameters (e.g., name of fruit etc.), and this may be encrypted. Background scanning with no external timing source (also for a farmer's marker profile, in one example) can include search periodicity, service identifiers and related parameters (e.g., name of fruit, etc.), and it also may be encrypted.

Considerations for a profile may include functionality related to NAN cluster initialization. For example, whether to start a NAN cluster, scan related parameters (including but not limited to those described above), how long to wait before starting a NAN cluster, and identifiers including but not limited to a service identifier and a device identifier (which may be optional). Also, if cluster is to be started parameters for starting a NAN cluster, the device location, the timing source to use (GPS/Cellular or WLAN synchronization), whether to be in push mode operation or wait for query, an interval for advertising (push mode), and query response criteria. Other considerations for a profile may include functionality related to merging with another NAN cluster. For example, how to discover a neighboring NAN cluster and scanning related parameters including but not limited to those as described earlier. Also, metrics to determine whether to merge, including but not limited to applications in the target network, population of the target network, age of the target network, and whether existing data sessions will be affected. In one example of a gaming profile, attributes from an application 402 define functionality related to seeking a NAN cluster to join, and if none exists, starting a NAN cluster. Also, for an existing NAN, whether one or more devices should advertise the presence of the NAN, or wait for a query from a new user/device that wishes to join a NAN.

Figure 5:
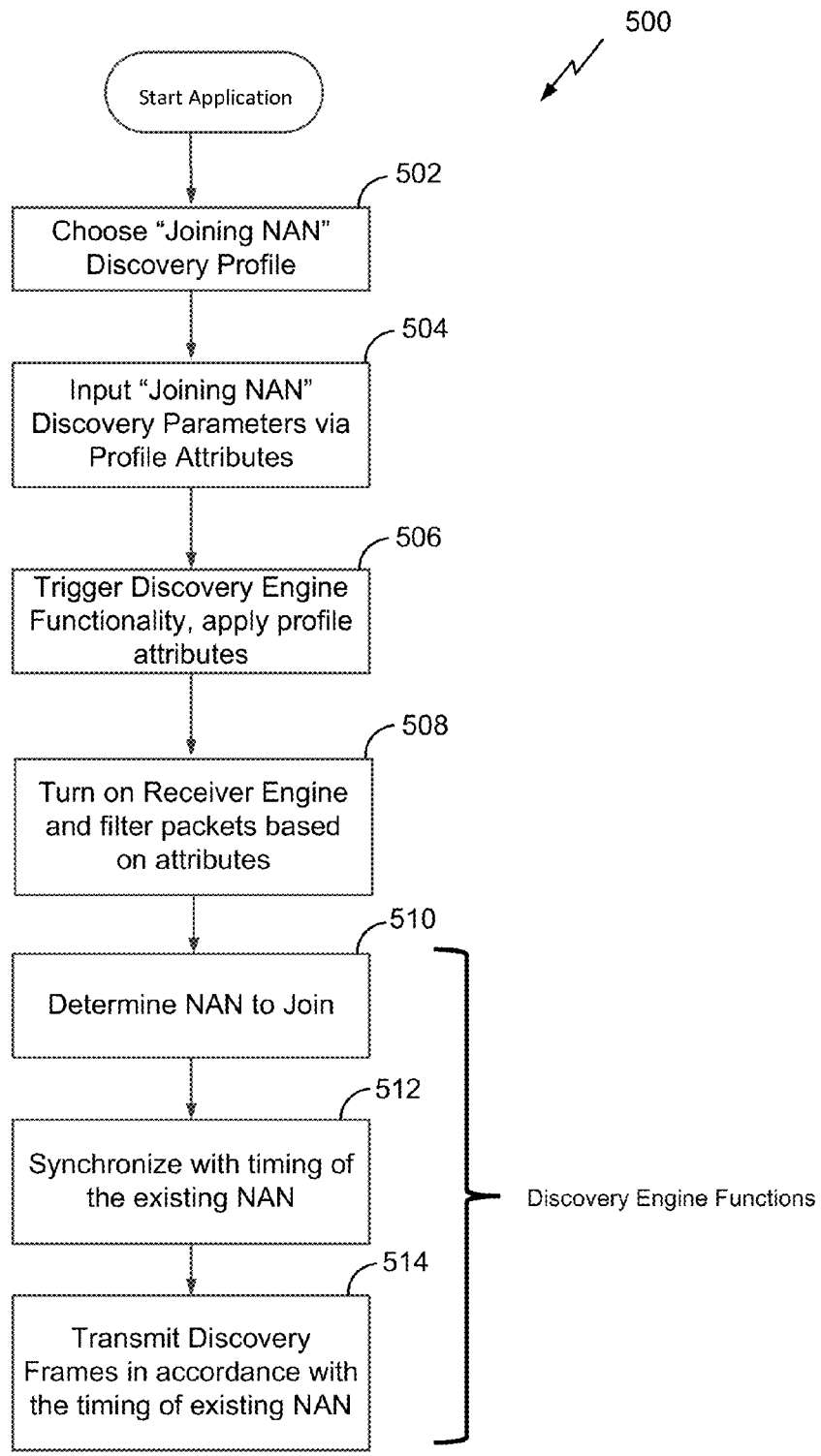
FIG. 5 illustrates a flow diagram for joining an existing near-area network (NAN).

FIG. 5 illustrates a flow diagram of a process 500 for joining an existing near-area network (NAN). Such a process can run on a wireless device having a discovery engine, for example, as illustrated in FIG. 2. The application starts, and at block 502 a "Joining NAN" discovery profile is selected by the application. At block 504, "Joining NAN" discovery parameters are input to the discovery engine via profile attributes. In some implementations, the application can provide some or all of the attributes. In various implementations, the parameters may include, but are not limited to, identifiers for network to join, timeout related information for searching, a sequence of channels to search, and information to be included in a discovery packet. In other implementations, some of the attributes are selected by a user via a user interface on the wireless device, or are provided by information the user has in memory on the wireless device. At block 506 discovery engine functionality is triggered, and the profile attributes are used to configure the functionality of the discovery engine. At block 508, received packets are filtered based on the attributes. At block 510 the discovery engine determines a NAN to join. At block 512 the wireless device seeking to join the NAN synchronizes timing with the existing NAN it seeks to join. At block 514, discovery frames are transmitted in accordance with the existing NAN to facilitate the wireless device joining the existing NAN.

Figure 6:
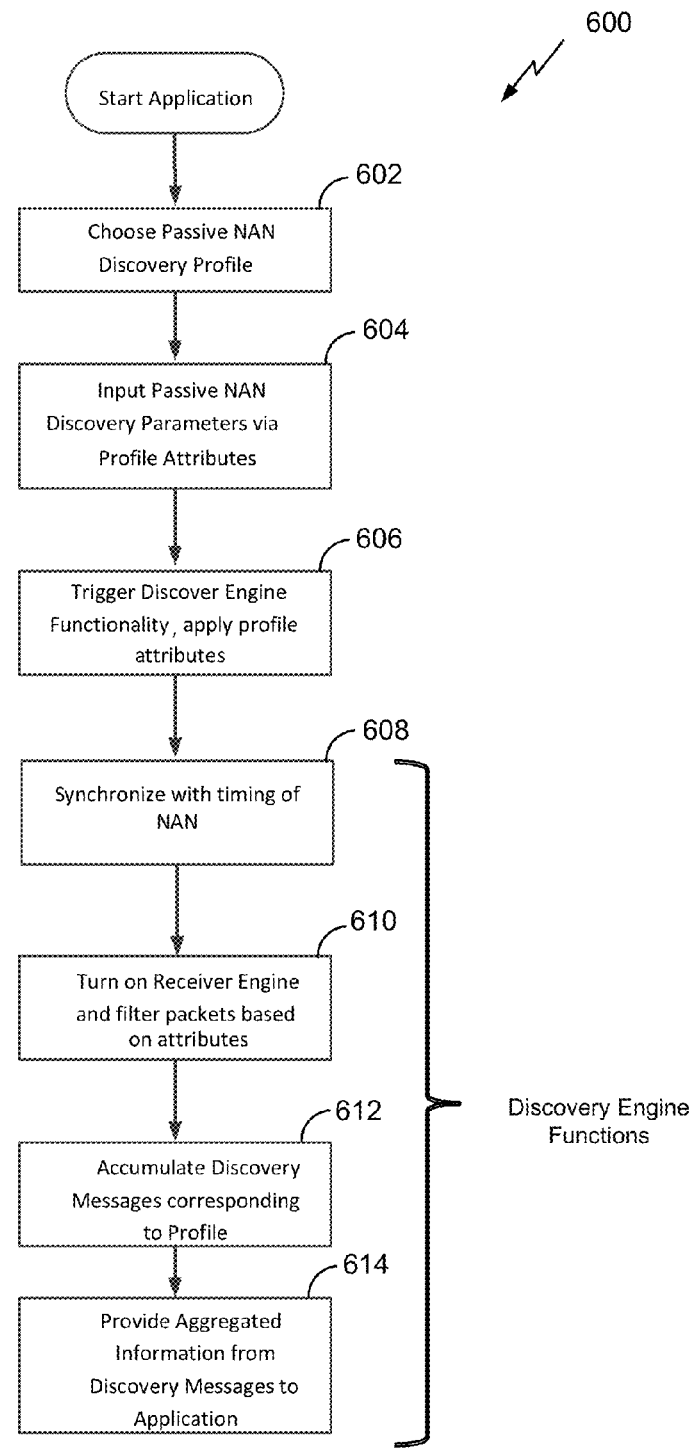
FIG. 6 illustrates a flow diagram of a passive near-area network search.

FIG. 6 illustrates a flow diagram of a process 600 for a passive near-area network search. An application is first started on a wireless device having a discovery engine. At block 602 the application selects a passive NAN discovery profile. At block 604, passive NAN discovery input parameters are input via attributes from the application running on the wireless device. In some implementations, the input parameters may include identifiers of NANs, and/or information relating to handling time out for discovery of NAN networks. In some implementations, one or more attributes may also be provided by a user or from other information stored in memory on the wireless device. At block 606 the discovery engine functionality is triggered and the profile attributes are applied to influence the actions of the discovery engine. At block 608, the wireless device synchronizes timing with an existing NAN. At block 610, a receiver engine is started and received packets are filtered based on the attributes and the profile. At block 612 the process 600 accumulates discovery messages corresponding to the profile. At block 614 process 600 provides aggregated information from the discovery messages to the application.

Tables 1 and 2 (below) lists examples of attributes that are associated with various functionality that a wireless device may perform to interact with a near-area network.

TABLE 1

Examples of Attributes associated with Initiation of NAN, Joining a NAN, and Query.

| Functionality | Attributes |
| --- | --- |
| Initiation of NAN | 1. Identifiers: Service Identifier, Device Identifier (Optional)<br>2. Device location<br>3. Timing Source: Use GPS/Cellular or WLAN synchronization<br>4. Push mode operation or Wait for Query |

TABLE 1-continued

Examples of Attributes associated with Initiation of NAN, Joining a NAN, and Query.

| Functionality | Attributes |
| --- | --- |
|  | 5. Interval for advertising (push mode)<br>6. Query response criteria |
| Joining a NAN | 1. Service Identifier(s) to search for<br>2. Device Identifier (optional)<br>3. Time out for search operation<br>4. Timing and Channel info of the NAN to optimizing the searching procedure<br>5. Preference criteria (metric) for choosing a NAN to join in case more than one is available |
| Query | 1. Service Identifier (s) to search for<br>2. Number of results to accumulate before returning a result<br>3. Time out to quit searching<br>4. Timing parameters of the NANs to query to optimize query procedure |

TABLE 2

Examples of Attributes associated with Passive Discovery and Cluster Merge.

| Functionality | Attributes |
| --- | --- |
| Passive Discovery | 1. Identifiers to search for<br>2. Number of NANs or devices to aggregate before reporting search<br>3. Timeout for quitting search |
| Cluster Merge | 1. Metrics for initiating a merge<br>2. Identifiers for networks to merge with |

Figure 7:
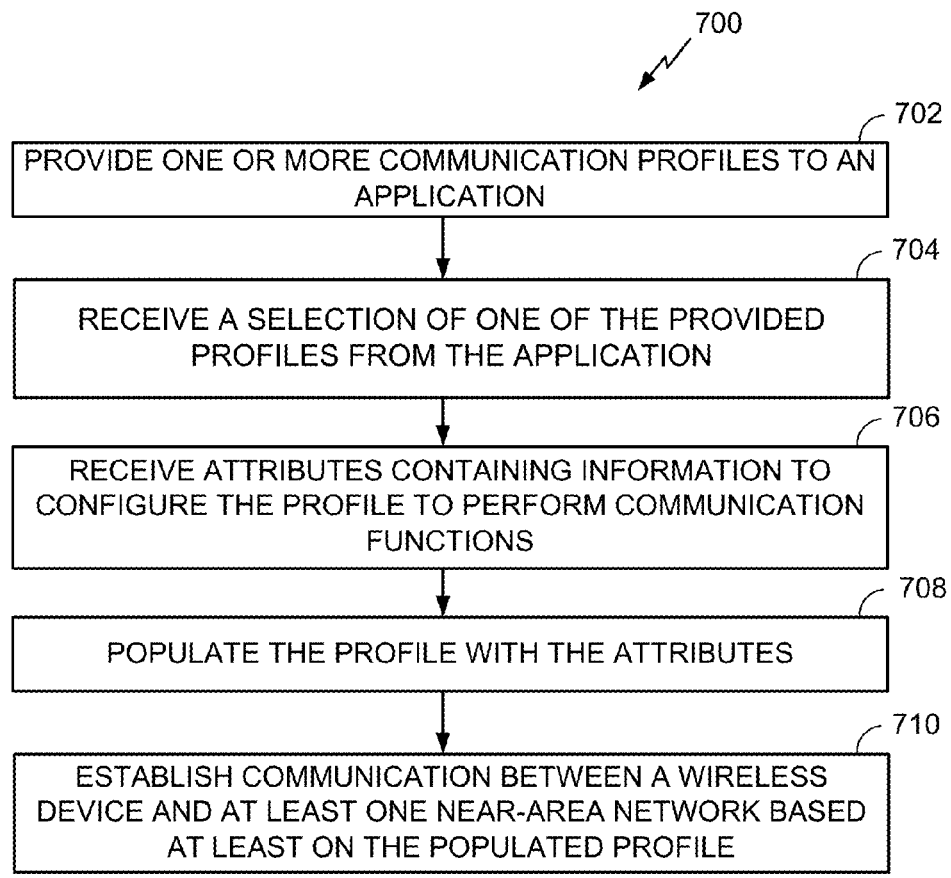
FIG. 7 illustrates a process flow diagram for a discovery engine interacting with an application for selecting a profile and populating the profile with attributes.

FIG. 7 illustrates a flow diagram for a process 700 for a discovery engine interacting with an application for selecting a profile and populating the profile with attributes. At block 702 the process 700 provides one or more communication profile to an application. The application can be running on a processor or the wireless device. In some implementations, a set of profiles are provided to the application by, for example, discovery engine 404 (FIG. 2). At block 704, the process 700 receives a selection of one of the profiles from the application. At block 706, the process receives one or more attributes containing information to configure the profile to perform communication functions. For example, an application running on processor 204 can provide the attributes to the discovery engine 404 through the bus system 226 (FIG. 2). At block 708 the profile is populated (or configured) with the attribute information. In some implementations, additional information is also used to populate (or configure) the profile, for example, user information that is stored in memory 206 of the wireless device 202 (FIG. 2). At block 710, the process 700 establishes communication between the wireless device and at least one communication network (for example, a near-area network) based at least on the profile.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-7 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wireless apparatus operable in a wireless communication system, the apparatus comprising:
a discovery engine configured to
communicate with a near-area network (NAN) based on a profile, the profile having defined use parameters,
receive an input from an application indicating a selection of the profile from a plurality of profiles, each of at least a subset of the profiles having a unique set of parameters selected for use for use in a predetermined context,
receive one or more attributes from the application, and
configure the profile using the one or more attributes, the attributes containing information to configure the profile to perform functions as defined by the application,
wherein the discovery engine is implemented in hardware or in a combination of hardware and software.

2. The apparatus of claim 1, further comprising:
a memory unit configured to store the plurality of profiles; and
a first processor in communication with the discovery engine, the first processor configured to run the application, communicate a selection of a profile to the discovery engine, and provide attributes for the selected profile to the discovery engine.

3. The apparatus of claim 2, wherein the discovery engine is configured to communicate to the first processor information regarding communication with the NAN according to the selected profile and provided attributes.

4. The apparatus of claim 2, further comprising a second processor, the second processor comprising the discovery engine.

5. The apparatus of claim 1, wherein the discovery engine is further configured to filter received packets based on the attributes and the profile.

6. The apparatus of claim 1, wherein the one or more attributes are limited to those related to the set of parameters present in the selected profile.

7. The apparatus of claim 1, wherein the one or more attributes are predefined by the profile and the one or more attributes modify the predefined attributes.

8. The apparatus of claim 1,
wherein at least one of the profiles is configured to perform the function of initiating the NAN and has one or more parameters selected from the group consisting of identifiers, device location, timing source, notification mode, interval for timing, and query response, and
wherein the one or more attributes received from the application define at least one of the one or more parameters.

9. The apparatus of claim 1,
wherein at least one of the profiles is configured to perform the function of joining the NAN and has one or more parameters selected from the group consisting of service identifiers to search for, device identifier, time out for search operation, timing and channel information, preference criteria for choosing the NAN when more than one NAN is present, and
wherein the one or more attributes received from the application define at least one of the one or more parameters.

10. The apparatus of claim 1,
wherein at least one of the profiles is configured to perform the function of query for service and has one or more parameters selected from the group consisting of service identifier to search for, number of results to accumulate before returning results, time out for search query, timing parameters of NAN to query, and
wherein the one or more attributes received from the application define at least one of the one or more parameters.

11. A wireless apparatus operable in a wireless communication system, the apparatus comprising:
a discovery engine configured to
communicate with a near-area network (NAN) based on a profile, the profile having defined use parameters,
receive an input from an application indicating a selection of the profile from a plurality of profiles,
receive one or more attributes from the application and configure the profile using the one or more attributes, the attributes containing information to configure the profile to perform functions as defined by the application, and
search for the NAN to communicate with based on the attributes and the profile and establish the NAN based on the attributes and profile if the NAN cannot be found,
wherein the discovery engine is implemented in hardware or in a combination of hardware and software.

12. The apparatus of claim 11, further comprising:
a memory unit configured to store the plurality of profiles; and
a first processor in communication with the discovery engine, the first processor configured to run the application, communicate a selection of a profile to the discovery engine, and provide attributes for the selected profile to the discovery engine,
wherein the discovery engine is configured to communicate to the first processor information regarding communication with the NAN according to the selected profile and provided attributes.

13. The apparatus of claim 12, further comprising a second processor, the second processor comprising the discovery engine.

14. The apparatus of claim 11, wherein the discovery engine is further configured to filter received packets based on the attributes and the profile.

15. The apparatus of claim 11, wherein the discovery engine is further configured to synchronize with the timing of the NAN.

16. The apparatus of claim 11, wherein
the apparatus further comprises a transmitter, and
the discovery engine is further configured to communicate discovery frames to the transmitter and
the transmitter is configured to transmit the discovery frames to the identified NAN.

17. The apparatus of claim 11, wherein the discovery engine is configured to communicate with the application when the NAN is found and when the NAN is established.

18. The apparatus of claim 11, wherein the one or more attributes received from the application are limited to those related to the set of parameters present in the selected profile.

19. The apparatus of claim 11,
wherein at least one of the profiles is configured to perform the function of initiating the NAN and has one or more parameters selected from the group consisting of identifiers, device location, timing source, notification mode, interval for timing, and query response, and wherein the one or more attributes received from the application define at least one of the one or more parameters.

20. The apparatus of claim 11, wherein at least one of the profiles is configured to perform the function of joining the NAN and has one or more parameters selected from the group consisting of service identifiers to search for, device identifier, time out for search operation, timing and channel information, preference criteria for choosing the NAN when more than one NAN is present, and wherein the one or more attributes received from the application define at least one of the one or more parameters.

21. A method of wireless communication for communicating between a wireless device and near-area devices communicating on a network, the method comprising:

providing a selection of a plurality of communication profiles to an application, each of at least a subset of the profiles having a unique set of parameters selected for use in a predetermined context;

receiving a selection of one of the provided profiles from the application;

receiving one or more attributes from the application, the one or more attributes containing information to configure the profile to perform functions;

populating the profile with the attributes; and establishing communication between the wireless device and at least one near-area network (NAN) based on the profile.

22. The method of claim 21, further comprising:

populating the profile with the attributes, and establishing communication between the wireless device and the NAN, wherein the plurality of communications profiles are stored in a memory, and wherein the application runs on a first processor.

23. The method of claim 22, further comprising communicating with the first processor running the application information regarding the communication with the near-area network.

24. The method of claim 21, further comprising filtering received packets based on the attributes and the profile.

25. The method of claim 21, wherein the one or more attributes received from the application define at least one parameter of the set of parameters.

26. The method of claim 21, wherein the one or more attributes containing information are limited to those related to the set of parameters present in the selected profile.

27. The method of claim 21, wherein the one or more attributes related to the set of parameters present in the selected profile are predefined by the profile and the one or more attributes modify the predefined attributes.

28. The method of claim 21, wherein at least one of the profiles is configured to perform the function of initiating the NAN and has one or more parameters selected from the group consisting of identifiers, device location, timing source, notification mode, interval for timing, and query response, and wherein the one or more attributes received from the application define at least one of the one or more parameters.

29. The method of claim 21, wherein at least one of the profiles is configured to perform the function of joining the NAN and has one or more parameters selected from the group consisting of service identifiers to search for, device identifier, time out for search operation, timing and channel information, preference criteria for choosing the NAN when more than one NAN is present, and wherein the one or more attributes received from the application define at least one of the one or more parameters.

30. The method of claim 21, wherein at least one of the profiles is configured to perform the function of query for service and has one or more parameters selected from the group consisting of service identifier to search for, number of results to accumulate before returning results, time out for search query, timing parameters of NAN to query, and wherein the one or more attributes received from the application define at least one of the one or more parameters.

31. A method of wireless communication for communicating between a wireless device and near-area devices communicating on a network, the method comprising:

providing a selection of a plurality of communication profiles to an application;

receiving a selection of one of the provided profiles from the application;

receiving one or more attributes from the application, the one or more attributes containing information to configure the profile to perform functions;

populating the profile with the attributes;

searching for a near-area network (NAN) to communicate with based on the attributes and the profile, and establishing the NAN based on the attributes and profile if the NAN cannot be found; and establishing communication between the wireless device and the NAN based on the profile.

32. The method of claim 31, further comprising:

populating the profile with the attributes, and establishing communication between the wireless device and the NAN, wherein the plurality of communications profiles are stored in a memory, and wherein the application runs on a first processor.

33. The method of claim 31, further comprising filtering received packets based on the attributes and the profile.

34. The method of claim 31, further comprising identifying the NAN based on the attributes and the profile.

35. The method of claim 31, further comprising synchronizing with the timing of the NAN.

36. The method of claim 31, further comprising communicating discovery frames to the NAN.

37. The method of claim 31, communicating with the application when the NAN is found and when the NAN is established.

38. The method of claim 31, wherein the one or more attributes containing information are limited to those related to the set of parameters present in the selected profile.

39. The method of claim 31, wherein at least one of the profiles is configured to perform the function of joining the NAN and has one or more parameters selected from the group consisting of service identifiers to search for, device identifier, time out for search operation, timing and channel information, preference criteria for choosing the NAN when more than one NAN is present, and wherein the one or more attributes received from the application define at least one of the one or more parameters.

40. The method of claim 31,
wherein at least one of the profiles is configured to perform the function of query for service and has one or more parameters selected from the group consisting of service identifier to search for, number of results to accumulate before returning results, time out for search query, timing parameters of NAN to query, and
wherein the one or more attributes received from the application define at least one of the one or more parameters.

* * * * *